United States Patent [19]

Papinchak et al.

[11] 4,017,241

[45] Apr. 12, 1977

[54] NOTCHED-FLIGHT FEEDER SCREWS FOR BRIQUETTING OPERATION

[75] Inventors: Michael J. Papinchak, Plum Boro; Dino Ravasio, McKeesport, both of Pa.

[73] Assignee: United States Steel Corporation, Pittsburgh, Pa.

[22] Filed: Nov. 7, 1975

[21] Appl. No.: 629,958

[52] U.S. Cl. ................................ 425/237; 425/363; 425/449; 425/208; 198/657

[51] Int. Cl.[2] ..................... B29C 3/00; B29C 15/00; B30B 3/00

[58] Field of Search .......... 425/194, 195, 237, 335, 425/337, 363, 373, 208; 198/213

[56] References Cited

UNITED STATES PATENTS

| | | | |
|---|---|---|---|
| 662,173 | 11/1900 | McGrath | 198/213 |
| 2,632,203 | 3/1953 | Laubarede | 198/213 X |
| 3,652,064 | 3/1972 | Lehnen et al. | 198/213 X |
| 3,824,054 | 7/1974 | Harris | 425/237 X |
| 3,901,635 | 8/1975 | Greenberger | 425/367 X |
| 3,932,086 | 1/1976 | Kasamatsu | 425/208 |
| 3,941,535 | 3/1976 | Street | 425/208 |

*Primary Examiner*—J. Howard Flint, Jr.
*Attorney, Agent, or Firm*—John F. Carney

[57] ABSTRACT

Frictional drag on the feeder screw of a briquetting press is reduced and a concomitant reduction in feeder screw drive power requirements is realized by providing all but the lowermost flight on the feeder screw with regularly spaced notches to allow the reverse flow of limited amounts of the material being fed to the press.

9 Claims, 4 Drawing Figures

NOTCHED-FLIGHT FEEDER SCREWS FOR BRIQUETTING OPERATION

BACKGROUND OF THE INVENTION

The present invention relates to roll-type presses for briquetting particulate material. More particularly, it relates to an improved screw feeder for use with briquetting presses of the aforementioned type.

Particulate materials produced by metallic ore beneficiating processes are commonly briquetted prior to shipment to produce a stronger, less porous material that is capable of resisting degradation during handling and is less prone to reoxidize. In roll-type briquetting presses heretofore known in the art, the particles which are typically of −1/16-inch mesh fineness are supplied from a feed hopper to a pair of power driven rolls where compaction occurs. The force necessary to feed the particles to the rolls is provided by a rotary screw feeder that is operative in the hopper. This force must be sufficient in magnitude to overcome the normal rejective forces induced upon the material within the roll nip. For this reason, it is common practice to form the feed hopper with downwardly convergent sides or to provide the feed screw with flights of varying pitch to precompact the material prior to its admission to the roll nip. Precompaction operates to render the feed material more dense on the screw flights and on the inner surface of the hopper adjacent the discharge opening. Such densification is detrimental to feeder operation, especially in the case of machines in which partially reduced iron ore powder is briquetted, in that it can occur to such an extent as to block the slight clearance space that exists between the peripheral edges of the screw flights and the hopper wall thereby preventing any reverse flow of material through this space and the relief that would otherwise be attained thereby. The result of such operating characteristics is the development of excessively high frictional drag forces on the feeder screw with a concomitant increase in power requirements for the screw drive. Moreover, when a comparatively coarse feed material such as pellets or lump ore is used, only a limited feed force can be applied to the screw to protect against jamming due to the poor flow properties of the large particles.

It is toward the improvement of feeder screws for particle briquetting machines, therefore, that the present invention is directed.

SUMMARY OF THE INVENTION

Accordingly, the invention provides in a briquetting press including a hopper containing particulate material to be briquetted, a pair of cooperating press rolls mounted for opposite rotation adjacent the discharge end of said hopper for pressing the particulate material fed thereto into briquettes, and a screw feeder having helical flights rotatably mounted in the hopper for feeding the particulate material to the press rolls wherein the improvement comprises: (a) a plurality of through openings provided on the flights for the reverse flow of particulate material therethrough; and (b) that screw flight adjacent the press rolls being devoid of through openings.

It is a principle object of the present invention, therefore, to provide an improved feed screw arrangement for roll-type briquetting mechanisms in which increased amounts of reverse flow of the feed materials is permitted without detracting from the forces necessary for pre-compaction.

It is a further object of the invention to provide an improved feed screw arrangement of the aforementioned type in which a greater percentage of the total power supplied to drive the apparatus will be converted into useful compactive energy.

Yet another object of the invention is to provide apparatus of the aforementioned type that is capable of producing briquettes characterized by significantly less porosity than those produced by apparatus heretofore known in the art.

Still another object of the invention is to provide apparatus of the aforementioned type that is capable of producing briquettes that experience less degradation during product handling and are less prone to re-oxidize prior to use.

These and other objects and advantages of the present invention will become evident when the following description is read in conjunction with the attached drawings.

DESCRIPTION OF THE PREFERRED EMBODIMENT

Figure 1:
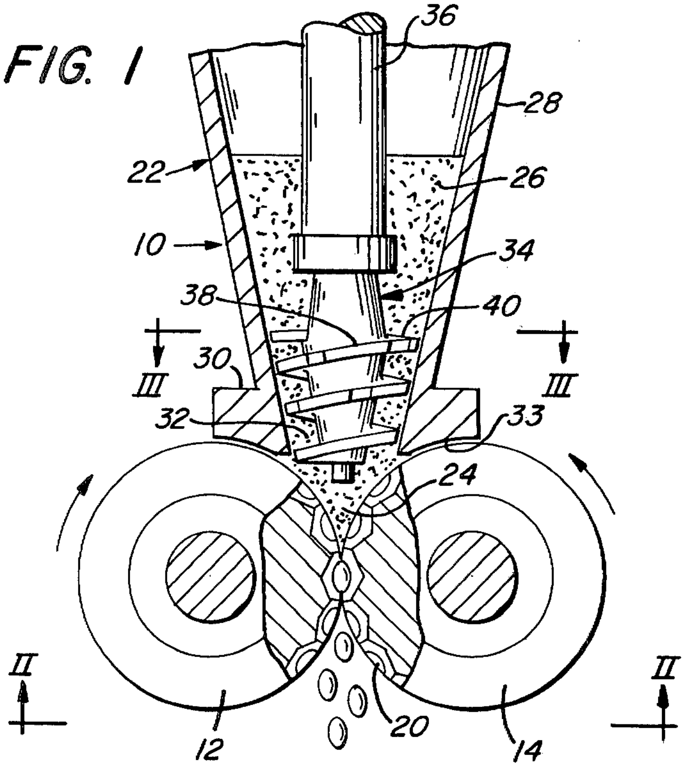
FIG. 1 is an elevational representation of a briquetting roll press with a feed hopper incorporating a screw feeder according to the present invention.
Figure 2:
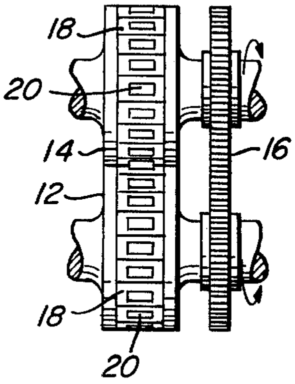
FIG. 2 is a bottom plan view of the roll press of FIG. 1 illustrating the cooperating press rolls and the drive therefor.

In the drawings there is illustrated a briquetting press of the roll type 10 in which particulate feed material is compressed into briquettes between a pair of cooperating rolls 12 and 14 that are connected through appropriate gearing 16 (FIG. 2) to be oppositely rotated by a power source (not shown). In the described embodiment of the invention the opposed surfaces 18 of the respective rolls 12 and 14 are provided with a plurality of circumferentially spaced recesses or pockets 20 which receive the feed material to be briquetted from superposed hopper 22. As shown in FIG. 1, the pockets 20 on the respective rolls 12 and 14 define mold halves which, when brought into registry with one another, compress the feed material discharged from hopper 22 into the roll nip 24 to form pillow-shaped briquettes. Alternatively, one of the rolls may have a peripheral surface that is devoid of pockets whereby D-shaped briquettes can be produced in a similar manner.

The hopper 22, which is adapted to contain a body 26 of particulate material to be briquetted, is formed of a vertically disposed, downwardly convergent, generally conical wall 28 that terminates in an annular flange 30 about a discharge opening 32. The lower portion of the flange 30 facing the rolls 12 and 14 may be arcuately shaped as shown in FIG. 1 to accommodate close disposition of the rolls with the members cooperating to define the roll nip 24.

A feeder screw 34 constructed according to the invention operates in the hopper 22 to induce downward flow of material from the body 26 toward the discharge opening 32 and to precompact the material prior to its delivery into the roll nip 24 thus enabling it to overcome the rejective forces imparted thereon in the nip. The feeder screw 34 comprises a vertically disposed shaft 36 coaxially arranged in the hopper 22 and journaled therein for rotary motion provided by appropriate drive means (not shown). The screw shaft 36 is provided with a plurality of helical flights 38, preferably having a uniform pitch. The peripheral edges of the flights are formed with a constantly reducing diameter in the downward direction to place them in close clearance relation to the wall of the hopper 22. The screw 34 may, as shown in FIG. 1, extend slightly beyond the discharge opening 32 of the hopper into the roll nip 24.

Figure 3:
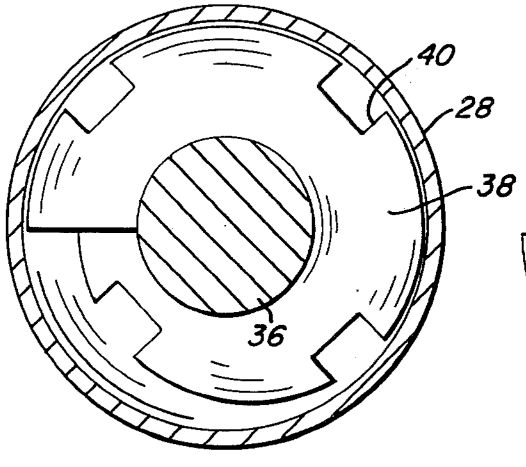
FIG. 3 is a view taken along line 3—3 of FIG. 1.
Figure 4:
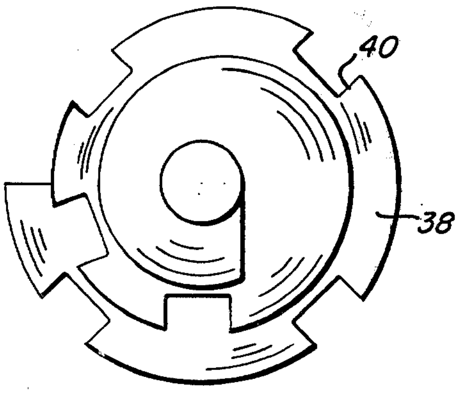
FIG. 4 is an end view of the screw feed of FIG. 1.

According to the invention the helical flights 38 are notched as shown best in FIG. 3 to provide a series of reclilinearly-shaped openings 40 along the length of the helix capable of permitting retrograde movement of the feed material along the feed path. The notches are substantially uniformly spaced along the length of the helix, preferably being positioned as shown in FIGS. 3 and 4 in non-aligned relation in the axial direction. The lowermost turn, indicated as 38' in FIG. 1, is devoid of openings 40 wherein the discharge opening 32 is choked, thus to impart the necessary degree of precompacting of the particles delivered to the roll nip 24.

The operation of the hereindescribed briquetting press organization is as follows: With a body of particulate feed material, such as partially reduced iron ore, or the like, deposited in the hopper 22, the press rolls 12 and 14 and the feeder screw 34 are both driven respectively at substantially constant rates by their associated drive means. The feed material in the hopper is thus induced to flow downwardly through the discharge opening 32 into the roll nip 24 from whence it is received in the pockets 20 of the rolls and compacted therein into pillow-shaped briquettes. The finished briquettes are discharged from the bottom-side of the hopper into an appropriate receptacle, or the like.

During operation the feeder screw 34 is driven at a rate to insure the supply of feed material to the roll nip that is greater than that at which it is removed by the press rolls. This can be conveniently effected without the imposition of an inordinate amount of drag on the screw flights by virtue of the fact that the material which is incapable of passing into the roll nip 24 can undergo retrograde movement across the screw flights 38 through the notched openings 40. However, that material contained in the hopper discharge opening 32 and the roll nip 24 is precompacted to the desired degree since the lower-most screw flight is devoid of notches and thereby serves to impart a compacting force on the material.

It is evident from the foregoing that, due to the reduction in drag forces on the feeder screw of the present invention, a greater amount of power employed to drive the feeder screw will be converted to useful compaction energy. Moreover, because retrograde flow of feed material can be accommodated across the screw flights the danger of jamming the mechanism, as may occur in the case of overdelivery of material to the roll nip, is avoided. Briquettes produced by the mechanism exhibit significantly less porosity than those produced by screw feeders heretofore known in the art. Such briquettes can undergo more strenuous handling without experiencing adverse degradation and, in the case of partially reduced ore, will be exposed to less danger of reoxidation.

An additional benefit to be derived from use of the present invention is the ability to expose coarse feed material to a longer residence time within the hopper whereby the coarse particles are exposed to the crushing action of the screw flights over an extended period before being forced into the roll nip. Moreover, such action can occur without danger of jamming the screw.

It will be understood that various changes in the details, materials and arrangements of parts which have been herein described and illustrated in order to explain the nature of the invention, may be made by those skilled in the art within the principle and scope of the invention as expressed in the appended claims.

What is claimed is:

1. In a briquetting press including a hopper containing particulate material to be briquetted, a pair of cooperating press rolls mounted for opposite rotation adjacent the discharge end of said hopper for pressing particulate material fed thereto into briquettes, and a screw feeder having helical flights rotatably mounted in said hopper for feeding said particulate material to said press rolls wherein the improvement comprises:

a. that screw flight adjacent said press rolls being substantially impervious to the retrograde movement of particulate material; and b. all the remaining screw flights having through-openings defining a passage for the retrograde movement of particulate material, which passage extends between said aforementioned screw flight and the interior of said hopper.

2. The improvement recited in claim 1 in which the screw flight devoid of through openings is limited to about one turn.

3. The improvement recited in claim 1 in which said flights are disposed in close clearance relation to the wall of said hopper and said through-openings are located along the peripheral edge of said flights.

4. The improvement recited in claim 3 in which said through-openings are disposed on uniform spacing about the circumference of said edge.

5. The improvement recited in claim 4 in which said through-openings are disposed at about 90° intervals about the circumference of said edge.

6. The improvement recited in claim 1 in which said through-openings are rectilinear in configuration.

7. A press for the briquetting of particulate material including:

a. a vertically disposed hopper formed as a hollow truncated surface of revolution containing particulate material to be briquetted and having a discharge opening at the lower end thereof;

b. a pair of cooperating press rolls mounted for opposite rotation closely subjacent said discharge opening, said press rolls defining a nip for reception of said particulate material and being operative to press the same into briquettes;

c. a screw feeder operative in said hopper for feeding particulate material to said press rolls, said screw feeder comprising:

i. a rotatable shaft disposed substantially parallel to the axis of said hopper and having its leading end disposed closely adjacent said nip;

ii. a screw defined by a plurality of helical flights on said shaft extending from the leading end thereof to the interior of said hopper;

iii. the peripheral edge of said flights being in close clearance relation to the internal surface of said hopper;

iv. that flight defining about one full turn from the leading end of said shaft being devoid of through-openings; and v. all the remaining flights being provided with through-openings defining a passage for the retrograde movement of particulate material communicating with the interior of said hopper.

8. Apparatus as defined in claim 7 in which said through-openings are disposed at regularly spaced locations along the peripheral edge of said flights.

9. Apparatus as defined in claim 7 in which said through-openings are disposed in mutual non-aligned relation in the axial direction.

* * * * *